United States Patent [19]

Terry

[11] Patent Number: 5,076,321

[45] Date of Patent: Dec. 31, 1991

[54] FLOW SENSITIVE FLUID SHUTOFF SAFETY DEVICE

[76] Inventor: Paul E. Terry, 23844 Via Jacara, Valencia, Calif. 91355

[21] Appl. No.: 637,709

[22] Filed: Jan. 7, 1991

[51] Int. Cl.⁵ ............................................... F16K 17/34
[52] U.S. Cl. .................................... 137/460; 137/554; 137/599; 251/129.04
[58] Field of Search ............... 137/460, 462, 504, 517, 137/599, 498, 599.1, 205.5, 512.1, 554; 251/129.04, 129.12, 129.13

[56] References Cited

U.S. PATENT DOCUMENTS

| | | | |
|---|---|---|---|
| 2,659,383 | 11/1953 | Frager | 137/460 |
| 3,747,616 | 7/1973 | Lloyd | 137/38 |
| 3,768,497 | 10/1973 | Mueller | 137/38 |
| 3,914,676 | 10/1975 | Madonian et al. | 251/129.12 X |
| 4,091,831 | 5/1978 | Pazmany | 137/38 |
| 4,156,437 | 5/1979 | Chivens | 137/554 |
| 4,299,251 | 11/1981 | Dugas | 137/554 X |
| 4,336,818 | 6/1982 | Dauvergne | 137/38 |
| 4,485,832 | 12/1984 | Plemmons et al. | 137/38 |
| 4,522,229 | 6/1985 | Van de Moortele | 137/498 |
| 4,665,932 | 5/1987 | Quenin | 137/498 |
| 4,809,748 | 3/1989 | Robins | 251/129.13 X |
| 4,880,030 | 11/1989 | Terry | 137/460 |

Primary Examiner—Stephen M. Hepperle
Attorney, Agent, or Firm—James Bartholomew

[57] ABSTRACT

A fluid shutoff device for use as a safety device to cut off the water supply to a building in the event of overly high water consumption due to a leak or break in the plumbing in the building is provided with a motor that is responsive to remote actuation to rotate a three position selector valve to a desired flow setting. The selector valve is settable in a position which allows water to flow freely through the safety flow control device as if it were not there, a position which diverts water through a safety flow pathway, or a position that prevents water flow into the main water line entrance of the building, thereby allowing the invention to act as a shutoff valve. At least one optoelectronic device is included in the safety device to monitor the flow position of the selector valve by detecting the absence or presence of light reflected off a sensor drum that rotates in synchronism with the selector valve. When the device is operating as a safety flow control device, a piston having apertures therethrough is spring biased away from a shoulder to allow water to pass through the device; when the water pressure is large, indicating a downstream plumbing break or leak, the water pressure will overcome the force exerted by the spring and force the piston against the shoulder, blocking the safety flow pathway and stopping flow through the device.

25 Claims, 5 Drawing Sheets

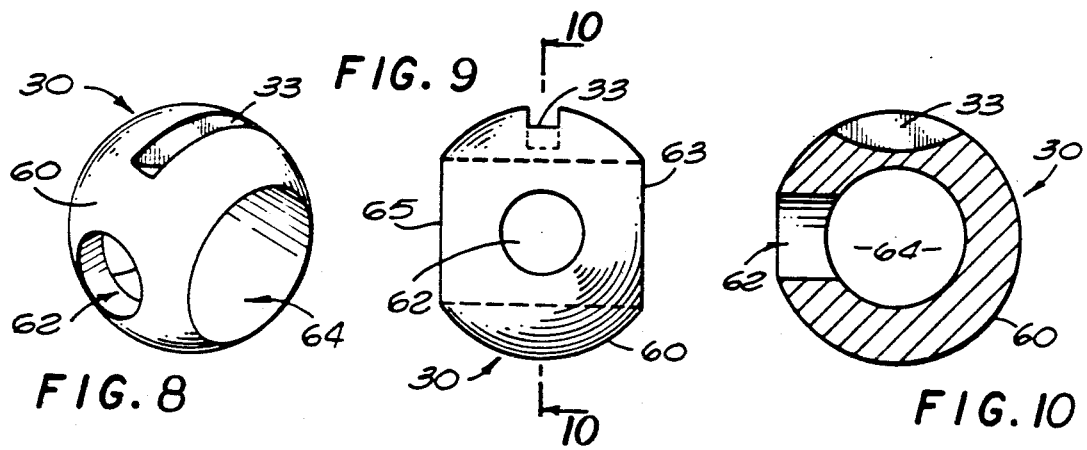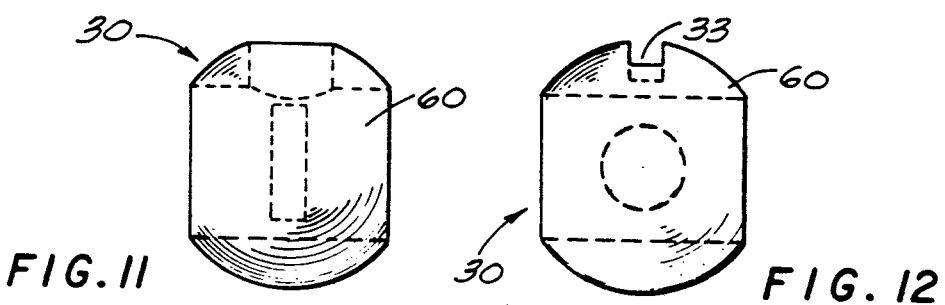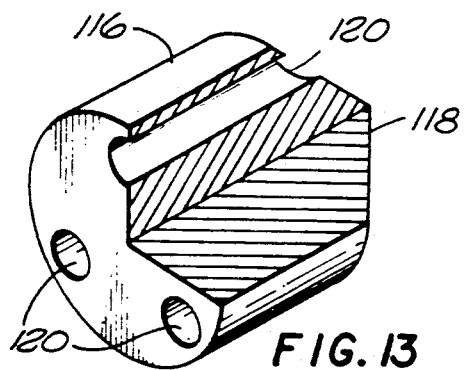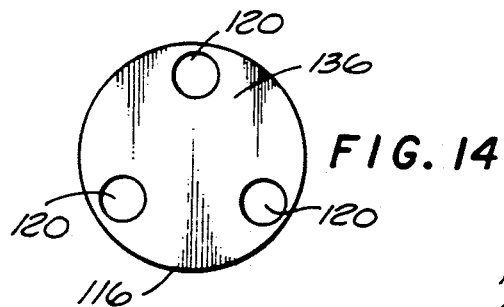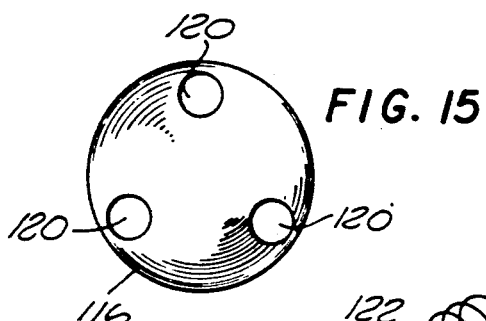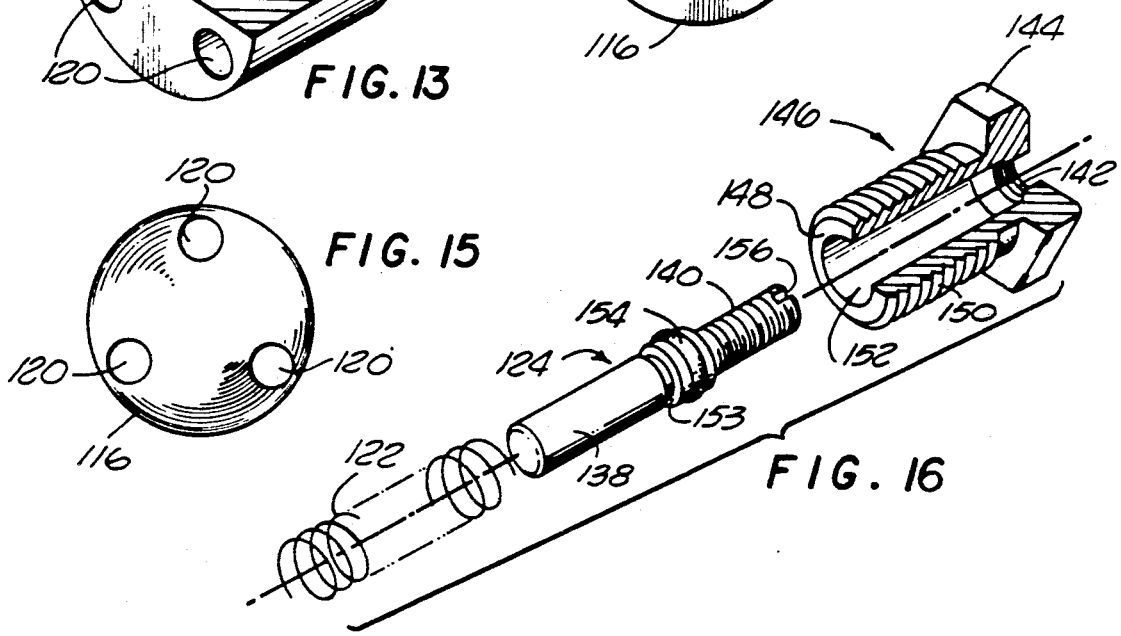

FLOW SENSITIVE FLUID SHUTOFF SAFETY DEVICE

BACKGROUND OF THE INVENTION

FIELD OF THE INVENTION

The present invention relates generally to a safety device which cuts off the water supply to a house or building in the event of overly high water consumption due to a leak or break in the plumbing in the house or building, and more particularly to an improved safety flow device having motorized drive that is responsive to control from a remote location to set the safety device at a desired flow setting, and optoelectronic devices to monitor that a selected setting has been achieved.

Other than fire, perhaps the most catastrophic type of damage which can occur to a home or other building is damage due to water leakage from a broken or badly leaking water line. Since water supply lines may run throughout a house or other building, a leak may occur in the heart of the house or other building, and may result in extensive damage both to the structure and to the contents prior to the water supply being manually shut off.

As will be known by those skilled in the art, there exist a number of devices which are designed to control flow, and to act as a shutoff in the event of a leak. These devices generally fall into two major categories, namely the shock operated type and the flow or pressure operated type. The shock operated device is designed to operate to shut off flow in the event of a major shock, such as that of an earthquake or the like. Examples of such devices are found in Lloyd U.S. Pat. No. 3,747,616, in Mueller U.S. Pat. No. 3,768,497, in Pasmany U.S. Pat. No. 4,091,831, in Dauvergne U.S. Pat. No. 4,336,818, and in Plemmons et al U.S. Pat. No. 4,485,832. These devices are all designed for use with gas lines, and do not address the problem of breaks or leaks in the line downstream of the devices.

The second approach, which causes a shutoff of flow in the event of an overly large flow rate or an excess pressure drop across the device is illustrated, for example, by Frager U.S. Pat. No. 2,659,383, Van de Moortele U.S. Pat. No. 4,522,229, Quenin U.S. Pat. No. 4,665,932. All three of these devices are designed primarily for industrial applications, and are large, complex, and expensive, and therefore, are inappropriate for use in a home or other relatively small building. Prior art that is exemplary of the second approach generally requires undesirable complex utilization of a multitude of moving parts. Moreover, many prior flow control devices are not designed to be responsive to the situation contemplated by the present invention, namely a leak in downstream plumbing.

The second approach, i.e. causing a shutoff of flow in the event of an overly large flow rate, was the basis for Applicant's previously patented fluid shutoff device, U.S. Pat. No. 4,880,030, issued Nov. 14, 1989 and titled "Safety Flow Control Fluid Shutoff Device." This patent is incorporated herein by reference. This previous fluid shutoff device presented a solution to the problem of plumbing breaks and leaks in a house or like building. Upon the occurrence of such a break or leak in the plumbing of a house or like building, Applicant's prior invention immediately senses the break or leak and promptly shuts down the flow of water to the problem plumbing.

The main causes of runaway water leakage are ruptured pipes, tubes or fittings; faulty washing machine hoses, water heaters, supply lines and other plumbing equipment; rusty or aging components, electrolysis, poor installation practices, poor quality materials, frozen pipes, tubes or hoses, earthquake activity and pressure surges. With so many different factors that can create plumbing failures and runaway water leaks, one can readily realize the need for a fluid shutoff safety device. Flooding in a home or other building brings water damage resulting in extensive destruction and expense. Massive difficulties ensue in the wake of interior structural flooding as families and businesses must contend with problems including substantial loss of time, money, and the home, office or other building involved.

Thus, there clearly exists a need for an improved fluid shutoff safety device that completely eliminates the potential hazard of flooding. Moreover, such a safety device is needed which has the capability to provide reduced flow sufficient for the needs of ice makers, water heaters, and low-flow demand appliances of all types. Preferably, such a needed safety device will be capable of providing a reduced flow therethrough as well as regular flow and fluid shutoff. The reduced flow capability will allow a user to contribute to water conservation efforts, thus keeping in line with an overall theme whereby a fluid shutoff safety device is needed that is compatible with community goals of water conservation, wherein the needed safety device mainly fulfills such conservation goals by effecting fluid shutoff during leaks to conserve water, and by the aforementioned reduced flow provisions. Further, an improved fluid shutoff safety device is needed that can be set for regular flow, reduced (or safety) flow, or zero flow from a remote location. This ensures that a user can advantageously change the setting of the device without having to venture outdoors to brave the elements, a desirable feature considering that the safety device will be of prime utility in guarding against runaway flows caused by frozen, ruptured pipes in frigid climates. With this consideration in mind, an improved safety device is also needed that includes features making said device weather resistant and impervious to freezing. The needed safety device desirably should have an extended highly reliable operating life, and must operate flawlessly and immediately upon the occurrence of a plumbing break or leak to shut off the flow of water before extensive damage occurs to the protected structure. Finally, such a needed improved safety device should desirably be motorized for remote, non-manual adjustment of the safety device flow setting, but also should be easily convertible from a motorized version to a manually adjustable version in order to accommodate a user's preference or special considerations. The present invention fulfills these needs and provides further related advantages.

SUMMARY OF THE INVENTION

The needed improvements over prior fluid shutoff devices as discussed above are achieved by the present invention. With this invention, a flow sensitive safety flow control device is installed in the line between the water supply line and the main water line entrance to a house or building to be protected. The safety flow control device has a three position selector valve which selectively either allows water to flow freely through the safety flow control device as if it were not there, diverts water through a safety flow pathway or acts as a fluid shutoff valve by preventing the flow of water into the main water line entrance. The three position selector valve is advantageously set at a preferred flow position by remote actuation of the valve using a motorized drive arrangement. The correct positioning of the selector valve is monitored by multiple optoelectronic devices for a precise setting.

When water is diverted to flow through the safety flow pathway, the safety mechanism of the present invention is brought into play. The safety flow pathway consists of a safety flow inlet channel into which water is diverted from the water supply line by the three position selector valve, a cylindrical valve chamber, a safety flow channel having a smaller diameter than the cylindrical valve chamber, and a safety flow outlet channel through which water exits the safety flow pathway into the main water line entrance to the protected house or building. The safety flow channel is located immediately downstream from the cylindrical valve chamber, and is concentric with and open to the larger diameter cylindrical valve chamber. The end of the cylindrical valve chamber adjacent the safety flow channel extends radially inwardly, creating a washer-shaped sealing shoulder.

Located in the cylindrical valve chamber is an essentially cylindrical piston valve body, which has in the preferred embodiment three apertures extending longitudinally therethrough closely adjacent the edges of the piston valve body. The piston valve body closely fits in the cylindrical valve chamber, and is free to move in the cylindrical valve chamber in reciprocating fashion. When the piston valve body abuts the washer-shaped sealing shoulder, the three apertures in the piston valve body are no longer in fluid communication with the safety flow channel. This is because the end of the piston valve body facing the entrance of the safety flow channel includes a nose segment that seals the safety flow channel shut when the piston valve body abuts the washer-shaped sealing shoulder.

A spring is used to bias the piston valve body away from the washer-shaped sealing shoulder, creating a safety flow pathway through the three apertures in the piston valve body, around the nose end of the piston valve body, and through the safety flow channel. In normal operating, water will flow through this safety flow pathway, and through the safety device into the main water line entrance of a protected structure. The water pressure and flow are balanced by the spring pressure to keep the safety flow path open. If water flow through the safety device becomes excessive, the pressure across the piston valve body will overcome the spring pressure, and force the piston valve body into contact with the washer-shaped sealing shoulder, thereby stopping flow through the safety device. In this manner, the invention is flow sensitive and will respond to rapid, runaway flow by executing fluid shutoff.

It will thus be appreciated by those skilled in the art that in the event of a break or serious leak in the plumbing line downstream from the safety flow control device of the present invention, the piston valve body will move into contact with the washer-shaped sealing shoulder to stop flow through the device. The only moving parts within the safety flow pathway are the piston valve body and the spring. By varying the relative size of the piston valve body, the size and number of the apertures in the piston valve body, and the force of the spring, the operating characteristics of the device may be varied.

If desired, the position of the spring may also be varied to adjust the force exerted by the spring on the piston valve body. To accomplish this, an adjustable spring guide is provided having a first end that provides an exposed shaft about which the spring is retained and a threaded second end that screws into a spring guide plug body. The second end is adapted for manipulation by a screwdriver to allow adjustment of the spring tension.

The selector valve is rotated into various flow positions by motor means including a 24 Volt AC motor having braking capability and a conventional geared drive arrangement. The motor is mounted atop motor mount studs which support the motor on a housing of the safety flow control device at a location directly above the three position selector valve. The motor is operatively associated with the selector valve via linkage means that include an actuator shaft.

As the motor driven actuator shaft rotates the selector valve, said shaft also rotates a sensor drum in synchronism with the rotation of the selector valve. The sensor drum includes reflective surfaces for the most part, however, three sets of non-reflective surfaces are provided on the drum. An optoelectronic device comprising at least one light emitting diode and at least one phototransistor is focused upon the exterior surface of the drum. The L.E.D. directs light onto the reflective surfaces of the drum and the phototransistor detects light reflected by said reflective surfaces. When the rotatable drum has rotated into a position whereat the selector valve is aligned at one of its three flow positions (remember the drum position corresponds to the selector valve position because the two are synchronously rotated), the optoelectronic device will become aligned with one of the three sets of non-reflective drum surfaces. This results in a stoppage of light being reflected back to the phototransistor, a situation which signals a control microprocessor that alignment in a different valve position (i.e., achievement of a new flow setting) has been completed.

Preferably, the optoelectronic device includes a pair of first and second L.E.D./phototransistor sets that are weighted binarily to read binary coded larger non-reflective areas designated to indicate flow setting info when scanned. Further, the optoelectronic device also includes a third L.E.D./phototransistor pair that detects smaller non-reflective areas. These smaller non-reflective areas serve as alignment markers to ensure that the first and second L.E.D./phototransistor sets are aligned with one of the larger non-reflective areas (a situation that will exist once a smaller non-reflective area is aligned with the third L.E.D.)

The optoelectronic device provides input into a circuit board having integrated circuit means that includes a CMOS integrated circuit. The CMOS integrated circuit provides input to the control microprocessor which allows for remote adjustment of the flow setting of the selector valve. This remote adjustment is executed by the control microprocessor signalling the motor to begin rotating the selector valve (thus also rotating the sensor drum). The control microprocessor stops the motor from rotating the selector valve further once the optoelectronic device has detected non-reflective areas, meaning that the sensor drum has finally rotated to a position corresponding to a selected flow setting of the selector valve.

The fluid shutoff safety device of the present invention includes an insulated, weather resistant outer cover that prevents motor or valve freeze-up in cold climates.

It may therefore be seen that the present invention presents an excellent resolution to the problem of plumbing breaks and leaks in a house or like building. Upon the occurrence of such a break or leak in the plumbing of a house or like building, the present invention immediately senses the break or leak, and promptly shuts down the flow of water to the plumbing. It also needs only two moving elements within the safety flow pathway to effect shutoff of the system, thereby making the device of the present invention as reliable as possible, with a long life expectancy.

In fact, the system of the present invention is totally reliable, with a fail-safe mode of operation to ensure reliable shutoff in the event of a plumbing break or leak even after years of use. The device also includes means for bypassing the safety flow operation if desired, thereby allowing it to function as a shutoff valve as well as to allow repairs to be done on the plumbing. Further, the present invention is simple of construction and installation to enable it to be easily and quickly installable into the plumbing system of any house or like building.

The device of the present invention is therefore remote controlled, has a highly reliable operating life, and operates flawlessly immediately upon the occurrence of a plumbing break or leak to shut off the flow of water, thereby advantageously preventing extensive water damage to the house or like building. It overcomes the disadvantages of the art and accomplishes all of the afore-stated advantages and objectives while incurring substantially no disadvantage, and thereby represents a highly desirable improvement in the art.

BRIEF DESCRIPTION OF THE DRAWINGS

The accompanying drawings illustrate the invention. In such drawings:

FIG. 8 is a perspective view of a ball-shaped three position selector valve for use in the valve housing of FIGS. 1-7, said selector valve having a slotted top portion, and also having a regular flow passageway therethrough and a smaller safety flow inlet hole oriented transversely to said passageway;

FIG. 9 is a side elevation view of the side of the selector valve having the safety flow inlet hole therein, with the flow passageway indicated by dotted outline, also illustrating that the configuration of the selector valve deviates from a ball shape along two opposite ends, each having its ball-shaped profile truncated along a vertical plane;

FIG. 10 is a cross-sectional view of the selector valve of FIGS. 8 and 9 taken generally along line 10—10 of FIG. 9, illustrating that the safety flow inlet hole is in fluid communication with the flow passageway and also showing the slotted top portion;

FIG. 1 is a bottom plan view of the selector valve of FIGS. 8-10, with the safety flow inlet hole, the slotted top portion and the flow passageway all being indicated by dotted outline;

FIG. 12 is a side elevation view of the side of the selector valve which is opposite the safety flow inlet hole (shown in dotted outline along with said flow passageway);

FIG. 13 is a perspective view of a piston valve body for use in the valve housing of FIGS. 1-7, with the piston valve body being shown in cutaway to reveal one of three apertures which extends longitudinally through the piston valve body;

FIG. 14 is a rear elevation view of the piston valve body of FIG. 13, illustrating that the three apertures are equidistantly spaced about the piston valve body;

FIG. 15 is a front elevation view of the piston valve body of FIGS. 13-14;

FIG. 16 is an exploded view of an adjustable spring guide for use in the valve housing of FIGS. 1-7, depicting a bolt-shaped plug that is partially cutaway to reveal a hollow shank and an aperture in the head portion of the plug, also illustrating a spring guide pin having one end that is threadably engaged within the aperture head portion, an opposite end that retains a spring, and a central portion that provides an O-ring seal;

FIG. 19 is a fragmented cutaway view of the portion of the safety device shown in FIG. 18, illustrating the three position selector valve in a position that prevents fluid flow through the fluid shutoff safety device, wherein FIGS. 17-19 depict the three positions of the selector valve;

DETAILED DESCRIPTION OF THE PREFERRED EMBODIMENT

As shown in the exemplary drawings, the improved flow sensitive fluid shutoff safety device of the present invention advantageously utilizes a motorized driving arrangement (FIGS. 1 and 2) to set the in-line safety device at a selected one of a plurality of flow settings and enhances this improvement by providing a plurality of optoelectronic devices (FIG. 2) for monitoring the setting of the safety device and for providing input to a microprocessor control module that enables one to advantageously alter the flow setting from distances far downline of the safety device. This latter feature beneficially allows an owner of a structure protected by the fluid shutoff safety device to switch the device into a safety flow setting whereat full fluid pressure with reduced fluid flow is delivered to the structure while the safety device is simultaneously prepared to respond to a detected rapid flow increase (such as that accompanying a pipe rupture) by triggering an automatic fluid shutoff, thereby quickly averting flooding damages. Moreover, the acute sensitivity of the safety device to flow increases downstream allows a leak as small as that presented by, for example, a pressurized hole only slightly larger than 1/16 inch in diameter to be detected, with such detection immediately stimulating complete flow stoppage through the flow sensitive safety device of the present invention.

Figure 1:
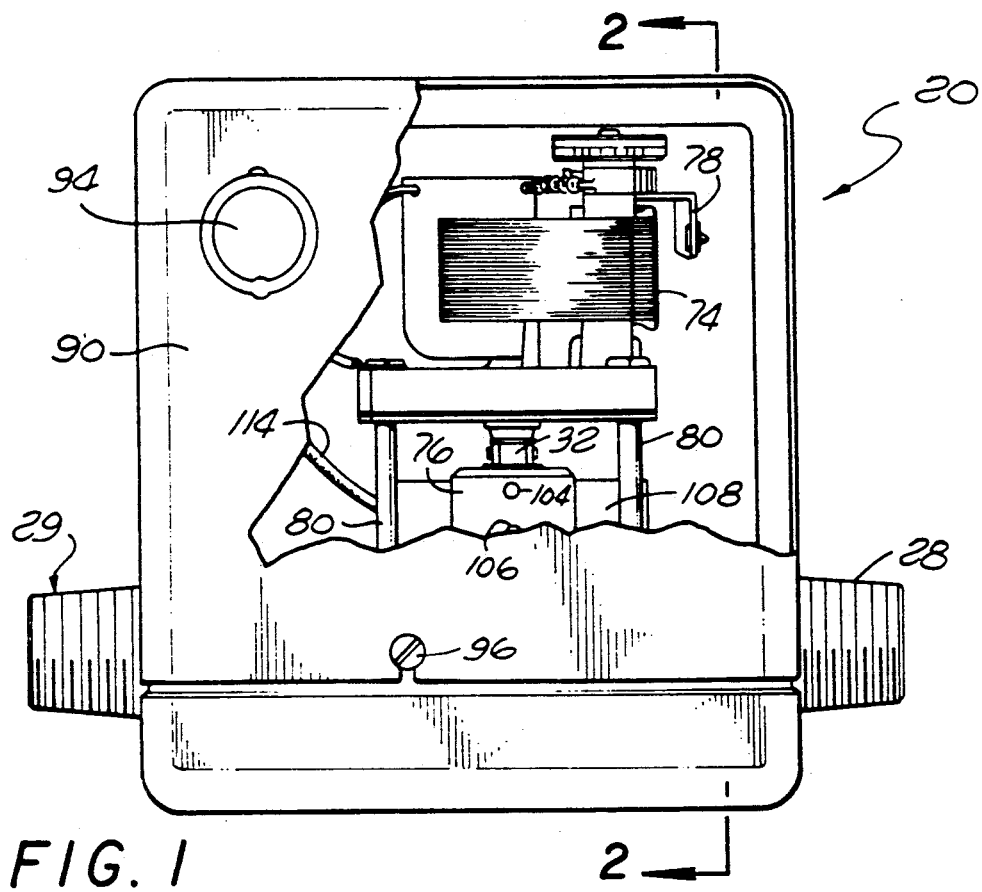
FIG. 1 is side elevation view of a fluid shutoff safety device embodying the invention, illustrating an outer cover in partial cut-away to reveal an internal layer of insulation, a motor, and a motor-driven drum (partially obscured)
Figure 2:
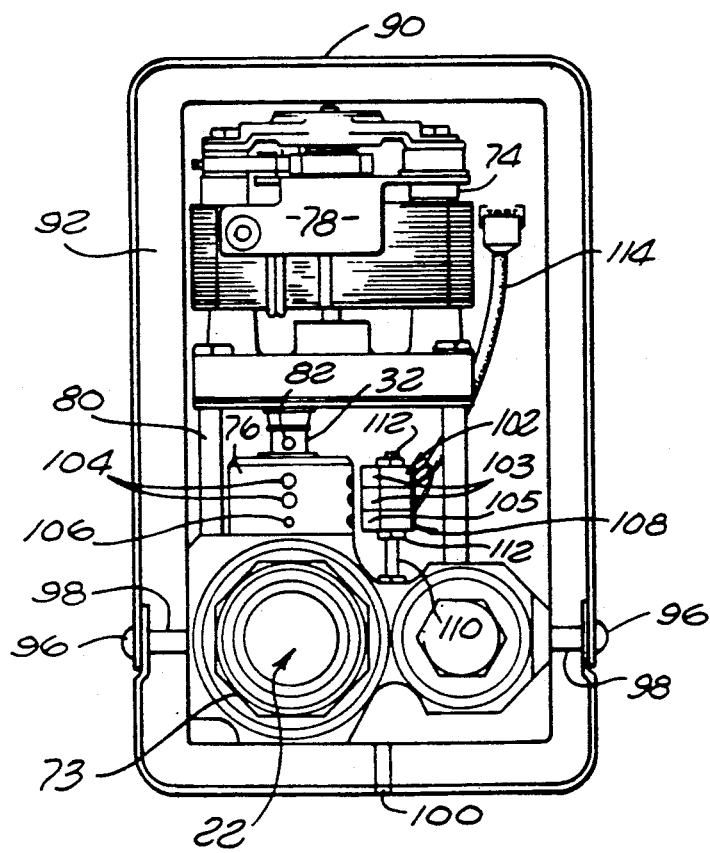
FIG. 2 is a cross-sectional end view taken generally along line 2—2 of FIG. 1, showing an inlet port of a valve housing having the motor of FIG. 1 mounted thereupon by four motor mount studs (only two of which are visible), also illustrating, in full, the drum of FIG. 1 having an optoelectronic device focused thereupon and further depicting a wire loom extending from the optoelectronic device and side screws attaching the outer cover to the valve housing.
Figure 17:
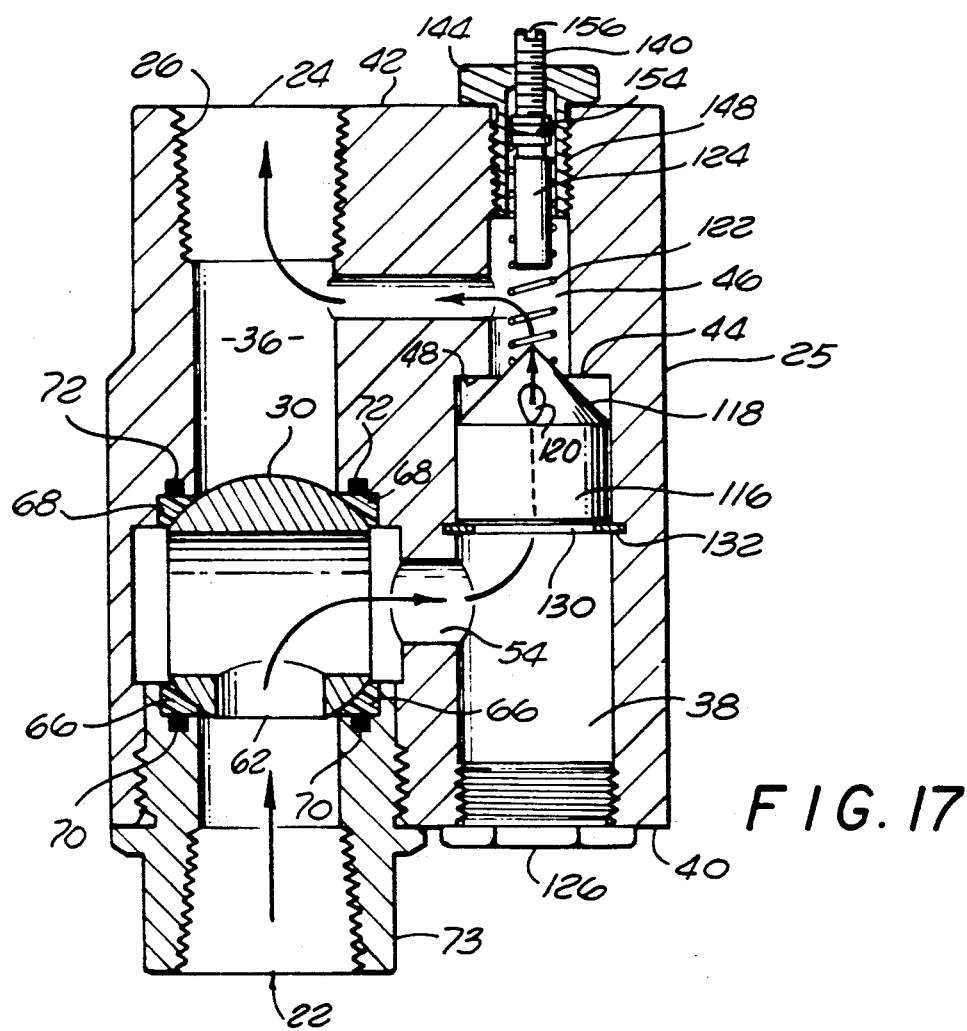
FIG. 17 is a cutaway view of the valve housing of an assembled fluid shutoff safety device of the present invention, showing the three position selector valve of FIGS. 8-12 in a position to divert flow through the safety flow channel, also showing the spring and the adjustable spring guide of FIG. 16 in place within the safety flow channel and biasing the piston valve body of FIGS. 13-15 away from an inlet to the safety flow channel to allow flow through the device, further depicting a seating arrangement wherein the selector valve rides upon two PTFE seats, each backed by an O-ring, and showing a selector valve retainer gland body in threaded engagement within the inlet port of the housing, the retainer gland body also supporting the seat and O-ring which are upstream of said selector valve.

In accordance with the present invention, and as illustrated in FIGS. 1, 2, and 17, a safety flow control device 20 is provided, having a main inlet port 22 and a main outlet port 24 located in opposite ends of a cast housing 25 (shown in cut-away in FIG. 17). The main inlet port 22 and the main outlet port 24 both include internally threaded portions 26 extending into the housing 25, as may be seen in FIG. 3, for example. Shown installed in the main inlet port 22 is a pipe union 28, and similarly installed in the main outlet port 24 is a pipe union, or nipple 29. The pipe unions 28 and 29 may be used in some installations, or other fittings well known in the art could also be used, as desired, with the size of the pipe fitting depending upon the piping system in which the safety flow control device is installed.

In either event, the main inlet port 22 will be connected to a water supply line (not shown), and the main outlet port 24 will be connected to the main water line entrance to a house or like building (not shown). Mounted in the housing 25 of the safety flow control device 20 in rotatable fashion is a three position selector valve 30 (see FIGS. 8-12 and 17-20) the construction of which will be discussed in detail in conjunction with FIGS. 8 through 12 below. Mounted into a top portion of the three position selector valve 30 is a valve actuator shaft 32 (FIG. 20) which engages a slot 33 atop the three position selector valve 30. A distal end 34 of the valve actuator shaft 32 may be adapted for a snug fit within the slot 33.

Referring next to FIGS. 3 through 7, the interior of the cast housing 25 is illustrated, using cutaway views. A cylindrical bore 36 extends through the housing 25 from one end to the other, with one end of the cylindrical bore 36 comprising the main inlet port 22, and the other end of the cylindrical bore 36 comprising the main outlet port 24. Note that both the main inlet port 22 and the main outlet port 24 are threaded to accept standard plumbing fittings (such as the pipe unions 28 and 29 shown in FIG. 1).

A cylindrical valve chamber 38 is cast within the housing 25 to extend from a first end 40 of the housing 25 in which the main inlet port 22 is located. The cylindrical chamber 38 extends slightly more than halfway through the housing 25 toward a second end 42 of the housing 25 in which the main outlet port 24 is located. The cylindrical bore 36 and the cylindrical chamber 3 are oriented substantially parallel to each other. Note that an internal end 44 of the cylindrical chamber 38 closest to the end 42 of the housing 25 is milled flat.

A safety flow channel 46 is cast within the housing 25 to extend from the end 42 of the housing 25. The safety flow channel 46 is substantially smaller in diameter than the cylindrical chamber 38. The safety flow channel 46 is concentric with, and in fluid communication with, the larger diameter cylindrical chamber 38. The end 44 of the cylindrical chamber 38 adjacent the safety flow channel 46 thus extends radially inwardly, creating a washer-shaped sealing shoulder 48. The cylindrical chamber 38 has a threaded portion 50 adjacent the end 40 of the housing 25 and the safety flow channel 46 has a threaded portion 52 adjacent the end 42 of the housing 25.

A safety flow inlet channel 54 is cast within the housing 25 to place the cylindrical chamber 38 in fluid communication with the cylindrical bore 36. The safety flow inlet channel 54 is located closer to the end 40 of the housing 2 in which the main inlet port 22 is located than it is to the end 42 of the housing 25 in which the main outlet port 24 in located. Note that the safety flow inlet channel 54 is essentially orthogonal to both the cylindrical chamber 38 and the cylindrical bore 36.

A safety flow outlet channel 56 is cast into the housing 2 such that said channel is in fluid communication with the safety flow channel 46 and the cylindrical bore 36. The safety flow outlet channel 56 is closer to the end 42 of the housing 25 than it is to the end 40 of the housing. Note that the safety flow outlet channel 56 is essentially orthogonal to both the safety flow channel 46 and the cylindrical bore 36.

Figure 3:
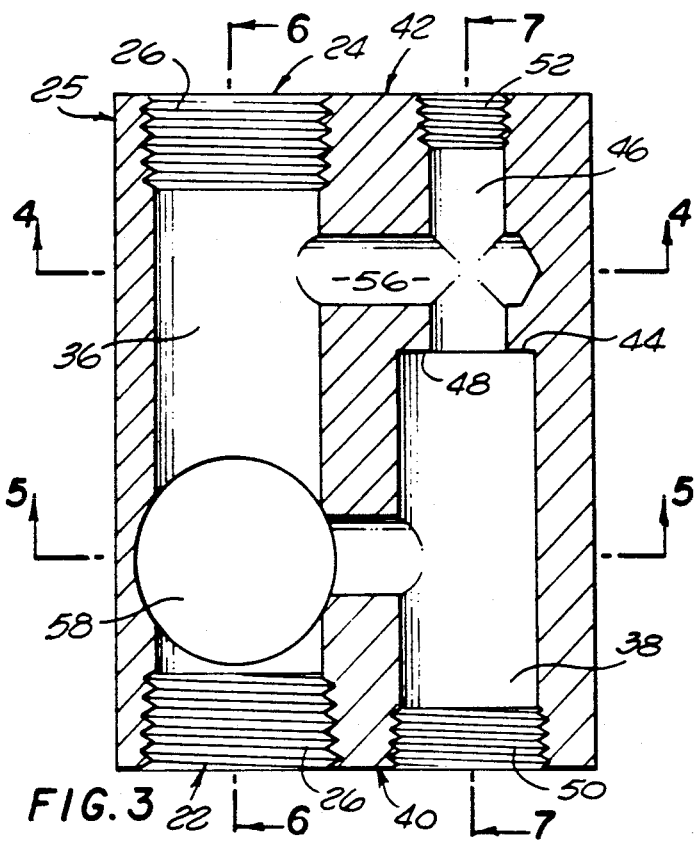
FIG. 3 is a cross-sectional view of the valve housing of the safety device shown in FIGS. 1 and 2.
Figure 6:
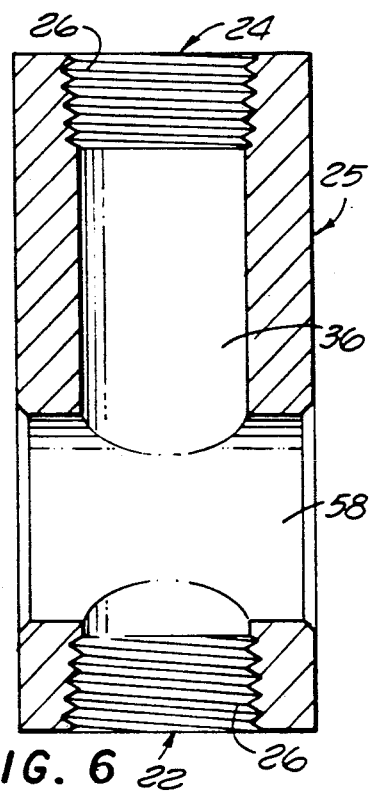
FIG. 6 is a cross-sectional view of the valve housing of FIGS. 1-5 taken generally along line 6—6 of FIG. 3, line 6—6 being along the centerlines of an outlet port and the inlet port of FIG. 2.
Figure 4:
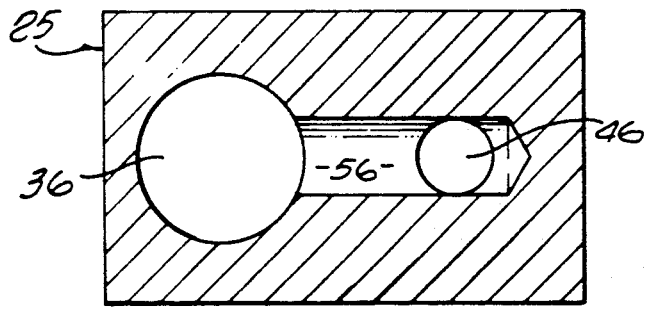
FIG. 4 is a cross-sectional view of the valve housing of FIGS. 1-3 taken generally along line 4—4 of FIG. 3, line 4—4 being along the centerline of a safety flow outlet channel.
Figure 5:
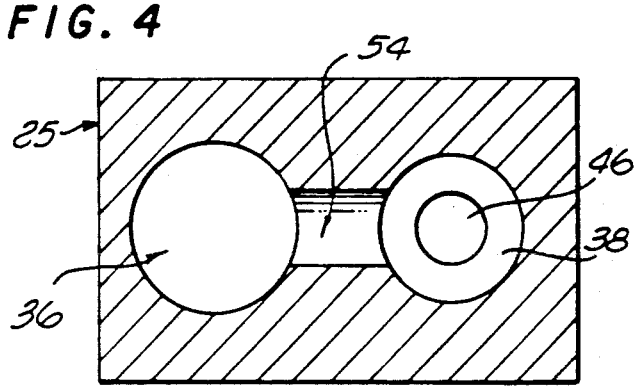
FIG. 5 is a cross-sectional view of the valve housing of FIGS. 1-4 taken generally along line 5—5 of FIG. 3, line 5—5 being along the centerline of a safety flow inlet channel.

Referring now to FIGS. 3 and 6, cylindrical aperture 58 is cast in the housing 25 such that the cylindrical aperture 58 intersects with, and is orthogonal to, both the cylindrical bore 36 and the safety flow inlet channel 54. The diameter of the cylindrical aperture 58 is substantially equal to the diameter of the cylindrical bore 36 (and is also larger than the diameter of the safety flow inlet channel 54). This aperture 58 accommodates the three position selector valve 30, described below. In the absence of this selector valve 30, the aperture 58 will always be in fluid communication with the cylindrical bore 36 and the safety flow inlet channel 54.

It will be appreciated that the cylindrical bore 36 extends directly between the main inlet port 22 and the main outlet port 24. An alternate fluid flow path is through a safety flow pathway which comprises the safety flow inlet channel 54 into which fluid may be diverted (by the selector valve 30) from the main inlet port 22, the cylindrical chamber 38, the safety flow channel 46, and the safety flow outlet channel 56 through which fluid may exit the safety flow pathway through the main outlet port 24. The preferred material for fabrication of the housing 25 is bronze SAE 43, but could also be brass or special plastic.

Referring now to FIGS. 8 through 12, the three position selector valve 30 is shown in detail. The three position selector valve 30 has a substantially spherical main body 60. A safety flow inlet hole 62 extends radially from one side of the main body 60, and is in fluid communication with an aperture 64, which passes completely through the main body 60 to provide a regular flow passageway 64 through the selector valve. The safety flow inlet hole 62 is orthogonal to the regular flow passageway 64, as evident in FIGS. 8-10. The safety flow inlet hole 62 is smaller in diameter than the regular flow passageway 64. A centrally located top portion of the three position selector valve 30 contains the slot 33 into which the valve actuator shaft 32 is installed. The configuration of the selector valve 30 is substantially ball shaped, however, the spherical main body includes a first end 63 that is truncated along a vertical plane and a second end 65 that is also truncated along a vertical plane. The regular flow passageway extends from the first truncated end 63 to the second truncated end 65, with the safety flow inlet hole 62 located substantially midway between the truncated ends 63 and 65.

The three position selector valve 30 is retained within the cylindrical aperture 58 (FIGS. 17-19) such that said valve is rotatable within said cylindrical aperture in response to impetus provided by motorized rotation of the valve actuator shaft 32. To facilitate smooth rotational action, the valve 30 rides on a pair of captivated, circumferential teflon seats 66 and 68 disposed within the aperture 58. A pair of O-rings 70 and 72 are provided, one adjacent to each teflon seat, for redundancy. The teflon seats 66 and 68 and O-rings 70 and 72 help maintain the three position selector valve 30 in preferred orientations within the cylindrical aperture 58, as well as providing a sealing effect where employed. The selector valve 30 is retained within the cylindrical aperture 58 by a retainer gland body 73, or ball retainer nut, which has a threaded exterior surface that threads into the inlet end of the cylindrical chamber 38, thereby defining, at least in part, the main inlet port 22. The retainer gland body 73 is removable by unscrewing it from engagement with the threaded portion 26 of the cylindrical chamber inlet end, and this action gains access to the selector valve 30, if desired. Moreover, the retainer gland body 73 has first end that is located externally of the housing 25 and that has an internally tapered, internally threaded portion adapted for engagement with other pipe fittings. The gland body 73 also has an interior second end that supports the upstream PTFE seat 66 in contact with the selector valve 30, such that the gland body 73 functions as a support structure for the upstream seating arrangement that the selector valve 30 rides in. Note that the upstream O-ring 70 is located between the gland body 73 and the upstream PTFE seat 66 while the downstream O-ring 72 is supported between the downstream PTFE seat 68 and an interior portion of the housing 25.

Figure 18:
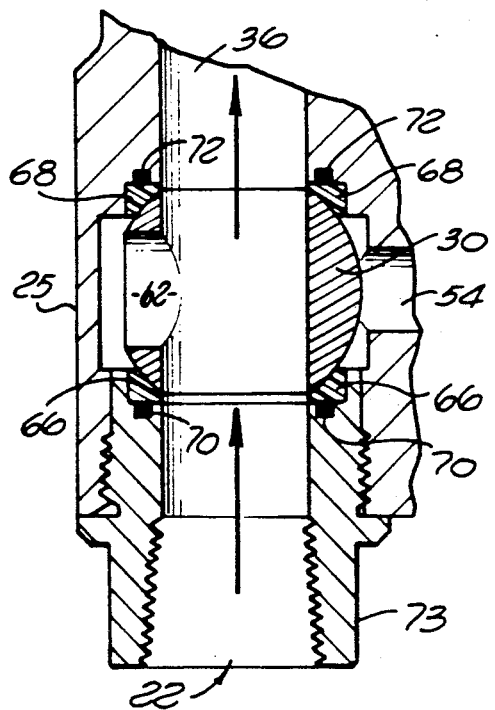
FIG. 18 is a fragmented cutaway view of a portion of the assembled fluid shutoff safety device shown in FIG. 17, illustrating the three position selector valve in a position that allows fluid to flow freely through said device along a path directly between the inlet port and the outlet port.
Figure 19:
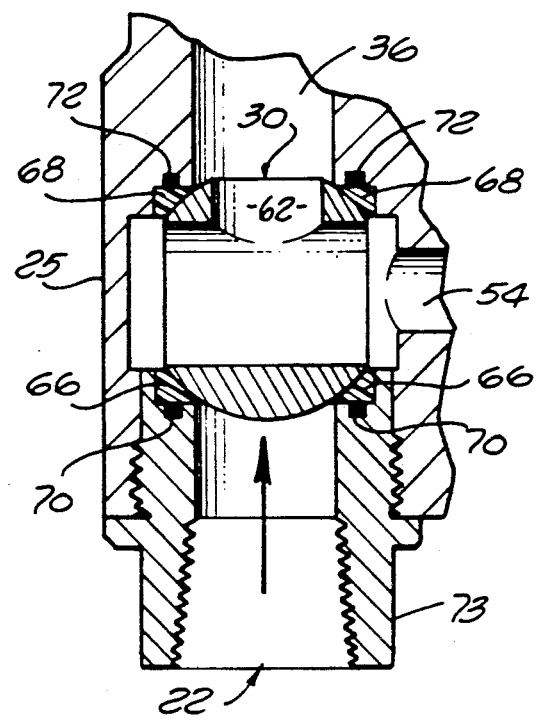

The three position selector valve 30 is selectively rotated between three positions (shown in FIGS. 17-19) corresponding to three flow settings. The first position, which allows fluid to flow freely through the safety flow control device 20 as if it were not there, is shown in FIG. 18. In this position, fluid, such as water, may flow from the main inlet port 22 through the regular flow passageway 64 in the three position selector valve 30 to the main outlet port 24. The second position, in which water enters the valve 30 through its safety flow inlet hole 62 and exits the selector valve through the larger flow passageway 64, results in flow being diverted into the safety flow pathway as shown by arrows in FIG. 17. The third position, which acts as a shutoff valve by entirely preventing the flow of water through the safety flow control device 20, is shown in FIG. 19. In this position, the three position selector valve 30 is turned so that its solid portion opposite the safety flow inlet hole 62 faces the main inlet port 22, thereby blocking any flow of water.

With reference now to FIGS. 1 and 2, the motorized driving arrangement for rotating the selector valve 30 to one of the three desired positions can be seen to comprise a motor 74 having a conventional gear drive that rotates the actuator shaft 32 and thus a rotatable drum 76 that is mounted on said shaft 32. Preferably, the motor 74 is a low voltage model, preferably 24 volts AC, capable of 5-7 rpm. The motor speed demands are modest because it is only necessary for the motor 74 to rotate the drum 76 about a third of a revolution in order to change the flow setting or flow position of the selector valve 30. The motor 74 must include braking capability in a conventional manner, such as a brake 78 shown in FIGS. 1 and 2.

Figure 20:
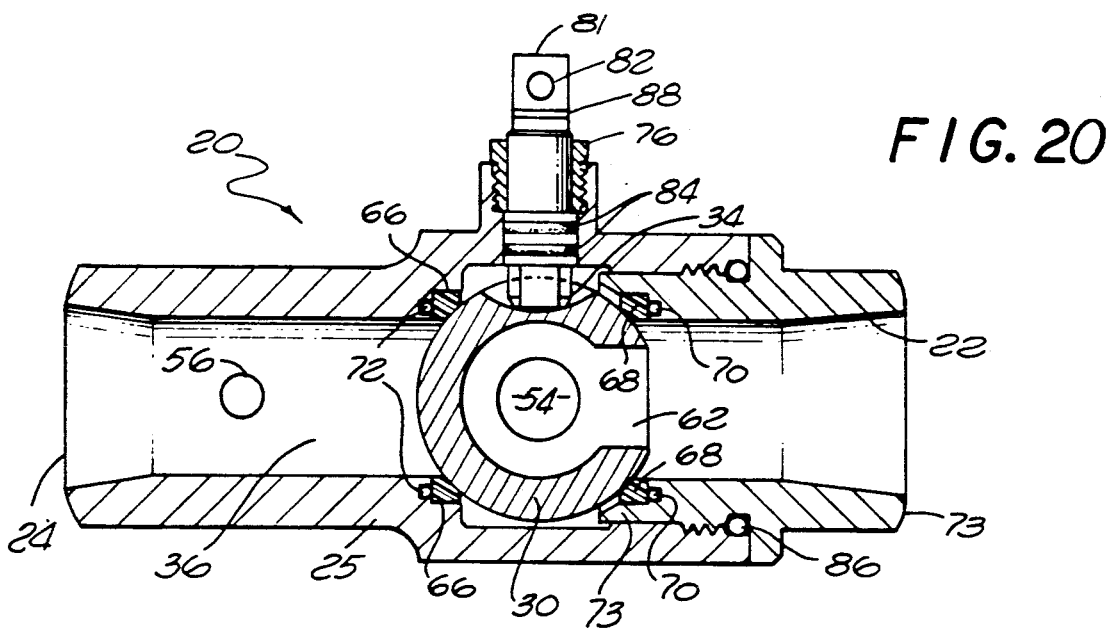
FIG. 20 is a cross-sectional view illustrating the interior of the valve housing as it would be seen if cutaway along a vertical plane through the selector valve, also illustrating the seating arrangement of FIGS. 17-19, the engagement of a distal end of an actuator shaft within the slotted top portion of the selector valve, and the drum of FIG. 1 being retained on said actuator shaft, and further showing the inlet and outlet of the safety flow outlet channel.

The motor 74 is supported above the housing 25 by at least three and preferably four, motor mount studs 80. A motor responsive to DC power is also within the scope of this invention, although not preferred. In order to more clearly view linkage means for allowing the motor 74 to rotate the selector valve 30, refer to FIG. 20 which illustrates engagement of the distal end 34 of the valve actuator shaft 32 within the slot 33 of the selector valve. A top end 81 of the actuator shaft 32 is akin to a hollow sleeve that receives either a motor drive axle (not shown) or a manual handle (shown in my previous U.S. Pat. No. 4,8890,030). A screw, or screws 82 in the top end 81 of the shaft 32 is used to ensure that a motor axle or manual handle accommodated within said hollow sleeve will not disengage therefrom. Thus, the actuator shaft 32 can be converted from a motor driven arrangement to a manually actuated arrangement, and vice-versa. Note also in FIG. 2 that the fluid-tight nature of the entire housing 25 is enhanced by the provision of sealing O-rings 84 around the actuator shaft 32 proximate its distal end 34 and by the provision of an O-ring 86 around the retainer gland body 73. FIG. 20 reveals that the rotatable drum 76 has a cylindrical passage therethrough which accommodates the actuator shaft 32 therein. In order to retain the drum 76 on the shaft 32, said shaft includes a circumferential groove 88 for retaining a removable snap ring (omitted to reveal groove location) that locks the drum 76 onto the shaft 32.

Advantageously, the motor 74, the housing 25, and all elements structurally associated therewith are protected from adverse weather by a metal or molded plastic outer cover 90 (FIGS. 1 and 2) that is preferably of the clam shell variety. In order to ensure that freezing temperatures will not affect the performance of the safety flow control device 20, a layer of insulation 92 is provided adjacent to inner surfaces of the outer cover 90. Preferably, ¾ to 1 inch of styrofoam insulation is employed. In order that wires may be passed into the outer cover 90, a knockout plug 94 (FIG. 1) is provided in one or more sides of said cover to allow for electric service to the safety device. The outer cover 90 is attached to the housing 25 by a plurality of mounting screws 96 that pass through mounting spacers 98 which are preferably nylon. The outer cover advantageously not only provides weather protection, but also blocks out ambient light that might otherwise interfere with light detected by the phototransistors of the optoelectronic devices to be discussed shortly. A vent hole 100 is provided in one or more locations within the bottom of the outer cover 90 in order to allow for drainage and ventilation.

An optoelectronic device 102 (FIG. 2) is provided as means for sensing when the motor 74 and the actuator shaft 32 have rotated the selector valve 30 to a selected one of the three flow positions. Preferred for this application is optoelectronic module, type TIL 139, sold by Texas Instruments. Towards this end, the optoelectronic device 102 includes at least one light emitting diode (L.E.D.) that projects light onto exterior surfaces of the rotatable drum 76. The drum 76 is substantially comprised of a light reflecting surface at drum locations which do not correspond with the selector valve 30 being aligned in one of its three flow positions. A correspondence exists between the drum position and the selector valve position because the actuator shaft 32 ensures that both the drum 76 and the selector valve 30 are rotated in synchronism. However, when the selector valve 30 has become aligned with one of its three designated flow positions, one of three corresponding sets of non-reflective areas 104 and 106 will simultaneously become aligned with a phototransistor, or light sensing element of the optoelectronic device 102. As a result, the phototransistor will suddenly cease to detect reflected light, due to the non-reflective areas 104 and 106, thus indicating that the selector valve 30 has become aligned in one of its three flow positions.

The results sensed by the phototransistors of the optoelectronic device 102 are inputted to integrated circuit means on a circuit board 108. The integrated circuit means includes a CMOS integrated circuit that provides a clean signal of the drum alignment (and thus flow position) detected by the phototransistors, said signal being inputted to control microprocessor means for enabling one to activate and/or brake and/or deactivate the motor 74 from a remote location, such as from inside a structure protected by the invention. Thus, the control microprocessor means is located at a distance far downline of the safety device.

Preferably, the optoelectronic device 102 comprise three optoelectronic modules, each include a L.E.D. and corresponding phototransistor means for detecting reflected light and outputting a signal of such detection to the control microprocessor via the CMOS integrated circuit. Of the three optoelectronic modules preferred for use in the optoelectronic device 102, two of the modules, indicated by reference numeral 103, are mounted to the circuit board 108 at positions appropriate for focusing on the top non-reflective areas 104 which indicate which of the three flow positions are set by the selector valve. Towards this end, each set of non-reflective areas 104 is different to produce a binary coded drum (for example, FIG. 1 illustrates a non-reflective area 104 having a single dot-like non-reflective surface while FIG. 2 illustrates a non-reflective area 104 having two dot-like non-reflective surfaces), and the two optoelectronic modules 103 for reading the flow position indicated by the drum are weighted binarily to be able to distinguish different non-reflective areas 104, and thus different flow positions of the selector valve 30. The remaining, or third, optoelectronic module 105 of the preferred set of three modules, is mounted to the circuit board 108 at a position appropriate for focusing on the smaller bottom non-reflective areas 106 which are used as an alignment marker for indicating that rotation of the drum 76 has aligned a non-reflective area 104 with one of the two "flow position"-reading optoelectronic modules 103. The third optoelectronic module 105 detects an "alignment" non-reflective area 106 to precisely align the non-reflective areas 104 for accurate readings thereof by the other two optoelectronic modules 103. Upon detection of a non-reflective area 106, the third optoelectronic module 105 provides input to the integrated circuit means which immediately triggers the control microprocessor to receive input indicating the flow position from any optoelectronic device aligned with a non-reflective area 104. The third optoelectronic module 105 thus fulfills three functions: it assures redundancy by backing up the other modules, it precisionizes the process of reading the radial drum position, and it provides for concurrent triggering of the control microprocessor when reading of the binary coded drum is necessary. Note that the non-reflective areas 104 and 106 are aligned vertically on the drum 76. This need not be the case as other arrangements of non-reflective areas on the drum 76 are well within the scope of this invention.

Although the non-reflective areas 104 and 106 can be dark spots, it is preferred that said areas be miniature cavities that have inner surfaces configured to prevent light reflection therefrom. Alternatively, the areas 104 and 106 can be provided by holes completely through the drum 76.

The circuit board 108 is supported by a mounting stud 110 that has a lower end in threaded engagement with the housing 25 and an upper end that employs threads and adjustable retaining nuts 112 to precisely position the circuit board 108, and thus the optoelectronic device 102 supported in operative association thereon, as desired. A shielded, quick disconnect wire loom 114 (FIG. 2) can be passed through a knockout plug 94 to place the optoelectronic device 102 in electrical communication with a power source.

Referring next to FIGS. 13-15, an essentially cylindrical piston valve body 116 is illustrated (shown in cutaway in FIG. 13). One end of the piston valve body 116 has a nose segment 118 extending therefrom, with the shape of the segment 118 in the preferred embodiment being conical. The piston valve body 116 is of a diameter which will closely fit in the cylindrical chamber 38 (FIGS. 3 and 7), while remaining free to move in the cylindrical chamber 38 in reciprocating fashion. In the preferred embodiment, the piston valve body 116 is made of PTFE commonly sold under the trademark "Teflon".

Figure 7:
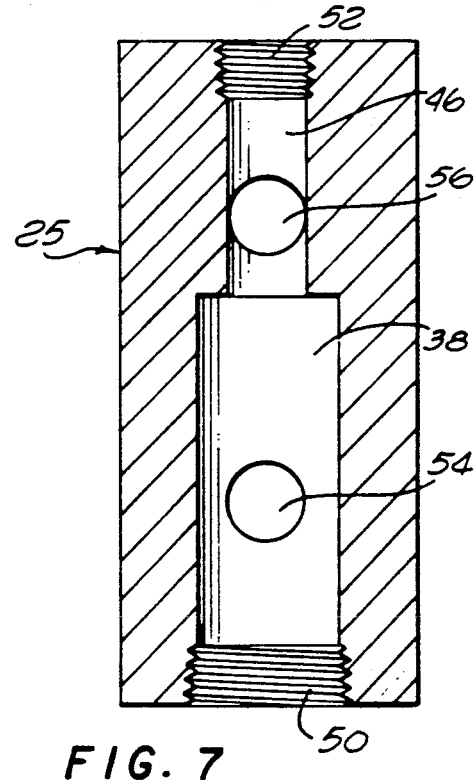
FIG. 7 is a cross-sectional view of the valve housing of FIGS. 1-6 taken generally along line 7—7 of FIG. 3, line 7—7 being along the centerlines of a cylindrical valve chamber and a smaller diameter safety flow channel.

The pointed end of the conical nose segment 118 is sized to fit within, and ultimately seal off, the inlet of the safety flow channel 46 when the piston valve body 116 abuts the washer-shaped sealing shoulder 48 (FIGS. 3 and 7). A plurality of substantially parallel tubular channels 120 extend longitudinally through the piston valve body 116 closely adjacent to the edges of the piston valve body 116. In the preferred embodiment, there are three channels 120 equidistantly spaced around the piston body as seen in FIGS. 14 and 15. Note that the outlets of the channels 120 are located on the conical nose segment 118. When the piston valve body 116 abuts the washer-shaped sealing shoulder 48 (nearly achieved in FIG. 17), the outlets of the three channels 120 in the piston valve body 116 are not blocked by the washer-shaped sealing shoulder 48, however, flow into the safety flow channel 46 is still blocked by the piston valve body because its conical nose 118 fills and closes the safety flow channel 46.

Referring next to FIG. 17, the piston valve body 116 is shown installed in the cylindrical chamber threaded 38 of the housing 25. Such installation is made possible by removal of threaded plug 126 which provides access to the cylindrical chamber 38. A spring 122 is used to bias the piston valve body 116 away from the washer-shaped sealing shoulder 48, thereby creating a flow path through the three channels 120 in the piston valve body 116, around the conical nose end 118 of the piston valve body 116, and through the safety flow channel 46 as shown in FIG. 17. One end of the spring 122 fits around a spring guide pin 124, and the other end of the spring 122 fits over the nose portion 118 of the piston valve body 116. The backward movement of the piston valve body 116 is limited by a retaining snap ring 130 that is held within a circumferential groove 132 in the cylindrical chamber 38's inner surface. This snap ring 130 ensures that the piston valve body 116 will never block the safety flow inlet channel 54.

When the selector valve 30 is set in the safety position (as in FIG. 17), during normal circumstances, water will flow into the safety flow control device 20 through the main inlet port 22, will enter the selector valve 30 through the safety flow inlet hole 62 and will exit the valve 30 through the regular flow passageway 64, then will flow through the safety flow inlet channel 54 into the cylindrical chamber 38, through the channels 120 in the piston valve body 116, around the nose end 118 of the piston valve body 116 and past the washer-shaped sealing shoulder 48, into the safety flow channel 46, then through the safety flow outlet channel 56, and out of the safety flow control device 20 through the main outlet port 24. From the main outlet 24, the water flows into the main water line entrance to the house or like building.

The water pressure and flow are balanced by the pressure of the spring 122 to keep the flow path open. If water flow through the safety flow control device 20 becomes excessive (the situation when a downstream leak or rupture presents a decrease in the resistance to flow, thereby increasing flow rate), the pressure against the piston valve body 116 (exerted by fluid pushing against the rear face 136 of the piston shown in FIG. 14), will overcome the pressure of the spring 122 and will force the nose 118 of the piston valve body 116 into contact with the washer-shaped sealing shoulder 48, thereby blocking the inlet to the safety flow channel 46 and stopping flow through the safety flow control device 20.

It will be appreciated by those skilled in the art that in the event of a break or serious leak in the plumbing line downstream from the safety flow control device 20 of the present invention, the piston valve body 116 will move into contact with the washer-shaped sealing shoulder 48 to stop flow through the safety flow control device 20. The only moving parts along the safety flow pathway (aside from manual adjustment of the spring guide pin position as discussed elsewhere) are the piston valve body 116 and the spring 122. By varying the relative size of the piston valve body 116, the size and number of the channels 120 in the piston valve body 116, and the force of the spring 122, the operating characteristics of the safety flow control device 20 may be varied.

If desired, the position of the spring 122 may also be varied to adjust the force exerted by the spring 122 on the piston valve body 116. With reference to FIG. 16, the spring guide pin 124 has a smooth first end 138 for engagement with the spring 122 and a threaded second end 140 that can be screwed into or out of a threaded aperture 142 in the head 144 of a bolt-shaped plug 146 to adjust the position, and thus the tension of the spring 122 at one end thereof. This of course will adjust the force exerted by the spring 122 on the piston valve body 116, and also the amount of water pressure required to move the piston valve body 116 into contact with the washer-shaped sealing shoulder 48, stopping flow through the safety flow control device 20. The spring guide plug 146 has a shank 148 having exterior threads 150 for engagement with a threaded port in the housing 25 and a tubular, interior hollow passage 152 that is coaxial with the threaded aperture 142 in the plug head 144. The spring guide pin 124 is accommodated within the hollow passage 152 and includes a central portion 153 between its ends 138 and 140. This central portion 153 is of a larger diameter than the rest of the spring guide pin 124 and provides sealing means for ensuring that fluid will not leak from the safety flow channel 46 through the aperture 142 in the spring guide plug 146. Towards this end, an O-ring 154 is provided in a groove (not visible) about the central pin portion 153. In order to facilitate manipulation by screwdriver, a slot 156 is provided in the second end 140 of the spring guide pin 124 to allow for spring tension adjustment.

The conical nose segment 118 of the piston valve body 116 is sized so that it will not entirely fit within the inlet of the safety flow channel 46 so that the channels 120 will not be within the safety flow channel 46 when the piston valve body 116 abuts the washer-shaped saling shoulder 48. Accordingly, flow will be stopped.

Figure 21:
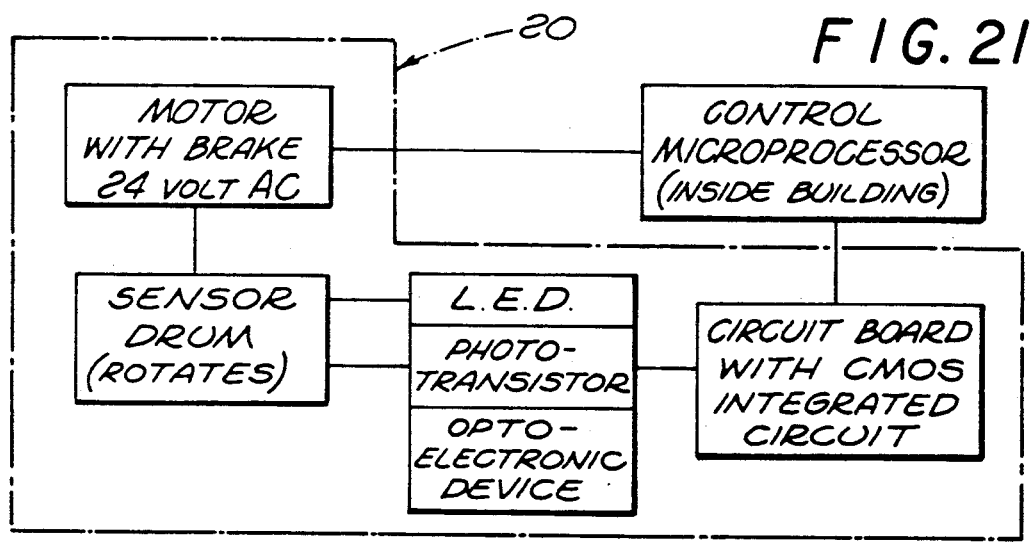
FIG. 21 is a schematic representation illustrating the interrelationship between operable elements of the invention, depicting that an optoelectronic device includes an L.E.D. (light emitting diode) that outputs light to the rotatable sensor drum (shown graphically in FIGS. 1, 2 and 20) and a photo-transistor that receives input from the drum (namely, light reflected therefrom), also depicting, with arrows representing the input/output relationships, a circuit board that receives input from the optoelectronic device, a control microprocessor that receives input from the circuit board, a motor that is responsive to the control microprocessor and that, in turn, rotates the selector drum or brakes its action, further note that a dotted line bounds elements that are contained in the fluid shutoff safety device, as opposed to the control microprocessor which is remote from the safety device.
Figure 22:
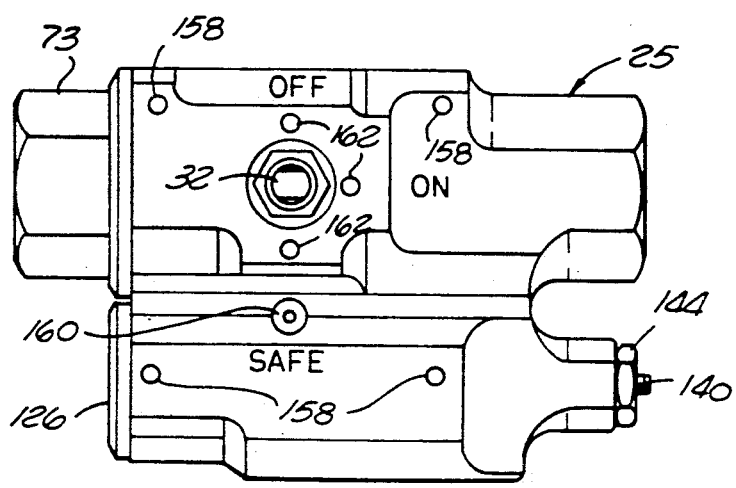
FIG. 22 is a top plan view of the outer surface of the valve housing, illustrating a location for attaching a mount for the optoelectronic device as well as preferred locales for attaching the motor mount studs of FIGS. 1 and 2.

FIG. 21 provides a schematic view of the relationship between the operable elements of the invention. The motor and its brake are responsive to the control microprocessor which indirectly controls the sensor drum rotation via the motor. Meanwhile, the L.E.D. outputs light to the rotating drum and the phototransistor either detects light reflected off of the drum or an absence thereof. The phototransistor provides input to the circuit board which in turn provides input to the control microprocessor via integrated circuit means.

Finally, the outer top surface of the housing 25 is notable in that it provides threaded apertures 158 for accomodating threaded lower ends of the motor mounting studs 80, a mounting pad 160 for supporting the circuit board mounting stud 110, and indents 162. The indents 162 are aligned with the off, on and "safety" positions that the safety device provides through the selector valve 30. These indents can be used as a stop means if the safety device is fitted with a manual handle rather than motorized drive. That is, the indents can engage a manually turned handle to stop said handle whenever alignment with a flow setting is achieved.

It is apparent from the above description of the present invention that it presents an excellent resolution to the problem of plumbing breaks and leaks in a house or like building. It immediately senses the occurrence of a break or leak in the plumbing of a house or like building, and promptly shuts down the flow of water to the plumbing. The present invention has a minimum of moving parts, thereby both minimizing the cost of manufacture and making the device of the present invention as reliable as possible.

The device of the present invention is completely reliable, and has a fail-safe mode of operation to ensure reliable shutoff in the event of a plumbing break or leak. It includes means for bypassing the safety flow operation if desired, allowing the device to function as a shutoff valve to allow repairs to be done on the plumbing. Further, the device of the present invention may be easily and quickly installed into the plumbing system of any house or like building.

The device of the present invention is thus simple and inexpensive in construction, has an extended, highly reliable operating life, and operates immediately upon the occurrence of a plumbing break or leak to shut off the flow of water, thereby preventing the possibility of extensive water damage to the house or like building. The present invention advantageously can be set for regular, safety, or zero flow from a remote controlling location and includes, for example, an improved seating arrangement for the selector valve, an improved arrangement for adjusting the spring bias, and beneficial convertibility between motor drive and manual manipulation of the selector valve. Moreover, the sensing arrangement of the present device is advantageously highly precise because a first optoelectronic device(s) senses alignment markings on a rotatable monitored surface to ensure that the monitored surface is precisely aligned for being sensed by second optoelectronic devices. Further, the present invention desirably improves upon Applicant's previously patented fluid shutoff device by introducing motorized, selective positioning of the selector valve, and it accomplishes all of the aforestated advantages and objectives while incurring substantially no disadvantage, thereby representing a significant improvement in the art.

Although an exemplary embodiment of the present invention has been shown and described, it will be apparent to those having skill in the art that a number of changes, modifications, or alterations to the invention as described herein may be made, none of which depart from the spirit of the invention. Accordingly, it is not intended that the invention be limited, except as by the appended claims.

I claim:

1. A safety flow control device for stopping the flow of fluid therethrough when there is a break or leak in the flow path downstream of said device, comprising:

a housing having a first end and a second end; an inlet port located in said first end of said housing for admitting fluid to said housing;

an outlet port located in said second end off said housing for discharging fluid from said housing;

a cylindrical valve chamber located in said housing, said cylindrical valve chamber having a first end and a second end, said first end of said cylindrical valve chamber being in fluid communication with said fluid inlet port;

a washer-shaped sealing shoulder located at said second end of said cylindrical valve chamber;

a safety flow channel located in said housing, said safety flow channel having a first end and a second end, said first end of said safety flow channel being defined by said shoulder and being in fluid communication with said second end of said cylindrical valve chamber, said second end of said safety flow channel being in fluid communication with said fluid outlet port;

a piston valve body located for reciprocating movement in said cylindrical valve chamber, said piston valve body having a plurality of longitudinally extending flow channels therethrough, said first end of said safety flow channel being blocked by said piston valve body when said body abuts said washer-shaped shoulder; and means for biasing said piston valve body away from said washer-shaped shoulder, said biasing means thereby allowing fluid entering said first end of said cylindrical valve chamber to flow through said piston flow channels and into said safety flow channel, said piston overcoming the biasing of said biasing means to move into contact with said washer-shaped shoulder thereby sealing said safety flow channel from being in fluid communication with said inlet port, when a break or leak in the flow path occurs downstream of said device;

wherein said cylindrical valve chamber comprises a first aperture provided in said housing such that said first aperture extends from said first end of said housing toward the second end of said housing;

wherein said safety flow channel comprises a second aperture provided in said housing such that said second aperture extends from said second end of said housing toward said first end of said housing, said first and second apertures being coaxial and in fluid communication with each other;

a third aperture provided in said housing such that said third aperture extends orthogonally through said first aperture;

a fourth aperture provided in said housing such that said fourth aperture extends orthogonally through said second aperture;

a fifth aperture extending from said first end of said housing to said second end of said housing, said fifth aperture being spaced away from said first and second apertures, one end of said fifth aperture comprising said inlet port, the other end of said fifth aperture comprising said outlet port, said third and fourth apertures being in fluid communication with said fifth aperture;

means for controlling the flow path taken by fluid entering said inlet port, wherein said means for controlling the flow path is selectively manipulatable to multiple positions corresponding to multiple flow paths, said device further including:

means for manipulating said flow path control means to a selected one of said multiple positions;

opto-electronic means for sensing when said manipulating means has manipulated said flow path control means to a selected one of said multiple positions, said opto-electronic means being operatively associated with, and providing input to, integrated circuit means; and remote microprocessing means for electronically activating and deactivating said manipulating means, wherein said microprocessing means is remote from, and is responsive to, said integrated circuit means, and wherein said manipulating means is responsive to said microprocessing means.

2. A safety flow control device as set forth in claim 1, wherein said manipulating means comprises motor means for driving the flow path control means operatively associated therewith, said motor means including means for braking.

3. A safety flow control device as set forth in claim 2, wherein said flow path control means comprises;

a three position valve having a first position in which fluid entering said inlet port flows through said fifth aperture directly to said outlet port, a second position in which fluid entering said inlet port is supplied directly to said third aperture, and a third position in which fluid entering said inlet port is prevented from communicating with any of the apertures in said housing.

4. A safety flow control device as set forth in claim 3, wherein said three position valve is located at the intersection of said third and fifth apertures.

5. A safety flow control device as set forth in claim 4, wherein said three position valve comprises a substantially ball-shaped body having a first end whereat said ball-shape is truncated along a vertical plane and a second end whereat said ball-shape is also truncated along a vertical plane, said ball-shaped body further including a regular flow passageway that passes completely through said body from its first truncated end to its second truncated end, and including a smaller safety flow inlet hole that is in fluid communication with said regular flow passageway.

6. A safety flow control device as set forth in claim 5, wherein said safety flow inlet hole is oriented relative to said flow passageway such that said inlet hole is disposed about a central axis that is substantially perpendicular to a central axis of said flow passageway.

7. A safety flow control device as set forth in claim 5, wherein said ball-shaped body is operatively associated with said motor means by an actuator shaft having a distal end adapted for releasible engagement with said ball-shaped body and having an opposite end that is driven by said motor means, said actuator shaft being disengagable from said ball-shaped body to allow substitution of a manually operated actuator shaft for said motor driven actuator shaft.

8. A safety flow control device as set forth in claim 7, wherein said ball-shaped body includes a slotted top portion adapted for releasible engagement with said distal end of said actuator shaft.

9. A safety flow control device as set forth in claim 2, wherein said safety flow channel has a first cross-sectional area that is smaller than a second cross-sectional area of said cylindrical valve chamber, said first and second cross-sectional areas being coaxial.

10. A safety flow control device as set forth in claim 3, wherein said three position valve pivotally rides within an arrangement comprising:

a first captivated, circumferential PTFE seat that is vertically oriented and inset within said housing at a locale that is adjacent to and slightly downstream of said three position valve; and a second captivated circumferential PTFE seat that is vertically oriented within said housing at a locale adjacent to and slightly upstream of said three position valve, wherein said first and second PTFE seats are backed by first and second O-rings respectively, said first O-ring being located between its associated PTFE seat and the housing.

11. A safety flow control device as set forth in claim 10, wherein said three position valve is retained within said housing by a retainer gland body, said retainer gland body defining, at least in part, said inlet port, said retainer gland body having a first end providing a threaded exterior position screwed into engagement with said housing, wherein said gland body has a second end that is located externally of said housing and that provides an internally tapered, internally threaded portion adapted for engagement with other piping sections, and wherein said first end of said gland body supports said second PTFE seat in contact with said three position valve, and wherein said second O-ring is located between the second PTFE seat and the retainer gland body.

12. A safety flow control device for stopping the flow of fluid therethrough when there is a break or leak in the flow path downstream of said device, comprising:

a housing having a first end and a second end; an inlet port located in said first end of said housing for admitting fluid to said housing;

an outlet port located in said second end of said housing for discharging fluid from said housing;

a cylindrical valve chamber located in said housing, said cylindrical valve chamber having a first end and a second end, said first end of said cylindrical valve chamber being in fluid communication with said fluid inlet port;

a washer-shaped sealing shoulder located at said second end of said cylindrical valve chamber;

a safety flow channel located in said housing, said safety flow channel having a first end and a second end, said first end of said safety flow channel being defined by said shoulder and being in fluid communication with said second end of said cylindrical valve chamber, said second end of said safety flow channel being in fluid communication with said fluid outlet port;

a piston valve body located for reciprocating movement in said cylindrical valve chamber, said piston valve body having a plurality of longitudinally extending apertures therethrough, said first end of said safety flow channel being blocked by said piston valve body when said body abuts said washer-shaped shoulder; and means for biasing said piston valve body away from said washer-shaped shoulder, said biasing means thereby allowing fluid entering said first end of said cylindrical valve chamber to flow through said piston apertures and into said safety flow channel, said piston overcoming the biasing of said biasing means to move into contact with said washer-shaped shoulder, thereby sealing said safety flow channel from being in fluid communication with said inlet port, when a break or leak in the flow path occurs downstream of said device;

means for controlling the flow path taken by fluid entering said inlet port, said flow path control means being rotatable to multiple positions corresponding to multiple flow paths;

motor means for rotating said flow path control means to a selected one of said multiple positions;

linkage means for allowing said motor means to rotate said flow path control means, said linkage means providing a substantially light-reflective rotatable surface that rotates in synchronism with the rotation of the flow path control means;

opto-electronic means for sensing when said motor means has rotated said flow path control means to a selected one of said multiple positions, said opto-electronic means being operatively associated with, and providing input to, integrated circuit means; and remote microprocessing means for electronically activating and deactivating said motor means, wherein said microprocessing means is remote from, and is responsive to, said integrated circuit means, and wherein said motor means is responsive to said microprocessing means;

wherein said opto-electronic means comprises at least one light-emitting diode means for directing a light beam upon said rotatable surface, and at least one phototransistor means for sensing light reflected off of said rotatable surface, said microprocessing means being responsive to said phototransistor means, via said integrated circuit means, to maintain activation of said motor means while reflected light is being detected by said phototransistor means; said rotatable surface also having non-reflective areas that align with said phototransistor means when said flow path control means rotates to one of said multiple positions, and wherein whenever said phototransistor means detects an absence of reflected light caused by a non-reflective area, said integrated circuit means triggers said microprocessing means to stop said motor means from rotating said flow path control means any further.

13. A safety flow control device as set forth in claim 12, wherein said flow path control means comprises:

a three position selector valve having a first position in which fluid may freely flow directly from said inlet port to said outlet port, a second position in which fluid may flow from said inlet port only to said first end of said cylindrical valve chamber and from said second end of said safety flow channel only to said outlet port, and a third position in which fluid may not flow either to said outlet port or to said cylindrical valve chamber;

wherein said opto-electronic means comprises at least three opto-electronic devices, each consisting of at least one light-emitting diode means and at least one phototransistor means, wherein said first, second and third positions are marked on said rotatable surface by corresponding first, second and third non-reflective areas, respectively, for indicating the selector valve position;

wherein at least two of said opto-electronic devices sense said first, second and third non-reflective areas to detect which of said three positions the selector valve is currently oriented at, and wherein said rotatable surface further includes alignment non-reflective area at locations thereon corresponding to said first, second, and third non-reflective areas, said alignment non-reflective areas providing means for indicating that rotation of the rotatable surface has aligned said first, second or third non-reflective areas with an opto-electronic device; and wherein at least one of said opto-electronic devices detects said alignment non-reflective areas and in response to such detection, said integrated circuit means triggers said microprocessing means to receive input indicating the selector valve position from any aligned opto-electronic device.

14. A safety flow control device as set forth in claim 13, wherein said first, second and third non-reflective areas each comprise one or more small cavities in said rotatable surface, and wherein said alignment non-reflective areas are also provided by small cavities in the rotatable surface.

15. A safety flow control device as set forth in claim 12, wherein said linkage means comprises an actuator shaft having a first end that is driven by said motor means and a second end that is operatively associated with the flow path control means, and wherein said actuator shaft has a removable drum thereabout and rotates said drum in synchronism with rotation of the flow path control means, said drum providing said substantially light-reflective rotatable surface.

16. A safety flow control device as set forth in claim 15, including releasible means for retaining said drum about said actuator shaft, wherein said first end of said actuator shaft includes a distal sleeve portion adapted to receive either a motor driven axle or a manual handle, and wherein said releasable retaining means and said sleeve portion provide means for adapting said actuator shaft for manual manipulation by removal of said drum and substitution of a handle for said axle.

17. A safety flow control device as set forth in claim 12, wherein said piston valve body comprises a cylindrical element having a conical nose portion extending from one end thereof, and wherein there are three apertures equidistantly spaced around the circumference of said cylindrical element.

18. A safety flow control device as set forth in claim 12, further including:

a protective outer cover which encloses said housing, said flow path control means, said motor means, and said opto-electronic means;

a layer of insulation adjacent to internal surfaces of said outer cover; and means for attaching said outer cover to said housing.

19. A safety flow control device as set forth in claim 12, wherein said integrated circuit means includes a CMOS integrated circuit.

20. A safety flow control device as set forth in claim 12, wherein said cylindrical valve chamber comprises a first aperture cast into said housing such that said first aperture extends from said first end of said housing toward the second end of said housing;
   wherein said safety flow channel comprises a second aperture cast into said housing such that said second aperture extends from said second end of said housing toward said first end of said housing, said first and second apertures being coaxial and in fluid communication with each other;
   said device further including a third aperture cast into said housing such that said third aperture extends orthogonally through said first aperture;
   a fourth aperture cast into said housing such that said fourth aperture extends orthogonally through said second aperture; and
   a fifth aperture extending from said first end of said housing to said second end of said housing, said fifth aperture being spaced away from said first and second apertures, one end of said fifth aperture comprising said inlet port, the other end of said fifth aperture comprising said outlet port, said third and fourth apertures being in fluid communication with said fifth aperture.

21. A safety flow control device as set forth in claim 20, wherein said first aperture includes means for preventing said piston valve body from blocking said third aperture.

22. A safety flow control device as set forth in claim 21, wherein said preventing means comprises a retaining snap ring and said first aperture includes a groove that holds said snap ring.

23. A safety flow control device as set forth in claim 20, wherein said second aperture extends through said second end of the housing, terminating in an internally threaded port, and wherein said biasing means includes a spring and an adjustable spring guide that is in threaded engagement with said internally threaded port, said spring having a first end in contact with said piston valve body and having a second end that is retained by said spring guide, said spring guide providing means for adjustably positioning said second end of the spring at various distances from the second end of the housing, thereby providing adjustable means for changing bias upon the piston valve body.

24. A safety flow control device as set forth in claim 12, wherein said second end of the safety flow channel extends through said second end of the housing, terminating in an internally threaded port, and wherein said biasing means comprises:
   an adjustable spring guide comprising a bolt-shaped plug having a hollow shank that is externally threaded, and a head, said plug head having an internally threaded aperture therethrough, said internally threaded aperture being coaxial with said hollow shank, said spring guide further including a guide pin having a first end and a second end, said second end of the guide pin having an externally threaded portion that screws into threaded engagement within said internally threaded aperture, said second end of the guide pin being accessible from outside the housing, said guide pin having a central portion located between its first and second ends, said central portion having a larger diameter than said internally threaded aperture, said central portion providing sealing means for sealing a distal end of said hollow shank from being in fluid communication with said internally threaded aperture in the plug head; and
   a spring having a first end in contact with said piston valve body and having a second end that is retained by the first end of the guide pin;
   wherein the threaded engagement of the second end of the guide pin within said internally threaded aperture allows for adjustably positioning the second end of the guide pin at different locations relative to said plug head, said adjustably positionable second end of the guide pin providing means for adjustably positioning the second end of the spring at various distances from said plug head, thereby providing adjustable means for changing bias upon the piston valve body.

25. A safety flow control device as set forth in claim 24, wherein said central portion of the guide pin includes at least one circumferential groove, and wherein said sealing means includes at least one O-ring disposed within said groove.

* * * * *